United States Patent [19]

Clark

[11] Patent Number: 4,729,039
[45] Date of Patent: Mar. 1, 1988

[54] METHOD AND DEVICE FOR PRODUCING FULL TONE IMAGES FROM A VIDEO INPUT

[75] Inventor: Ronald L. Clark, Indianapolis, Ind.

[73] Assignee: Quanta Labs, Inc., Indianapolis, Ind.

[21] Appl. No.: 936,227

[22] Filed: Dec. 1, 1986

[51] Int. Cl.[4] .................................................. G11B 7/18
[52] U.S. Cl. ..................................... 358/302; 346/108; 358/200; 358/293
[58] Field of Search ....................... 358/302, 200, 293; 350/96.24, 96.25, 96.27; 346/76 L, 108, 107 R, 160

[56] References Cited

U.S. PATENT DOCUMENTS

| | | | |
|---|---|---|---|
| 2,967,906 | 1/1961 | Blake et al. | 358/293 |
| 3,770,910 | 11/1973 | Rose et al. | 358/200 |
| 4,317,137 | 2/1982 | Tompkins | 358/293 |

Primary Examiner—Clifford C. Shaw
Attorney, Agent, or Firm—Woodard, Emhardt, Naughton, Moriarty & McNett

[57] ABSTRACT

A full tone image recorder which uses LEDs or the like, a thin fiber optic strip and a scanning belt with an aperture therein drawn across the fiber optic strip to create a flying spot of light for irradiating photosensitive material and producing thereon a photographic quality image of data contained in a video input.

29 Claims, 6 Drawing Figures

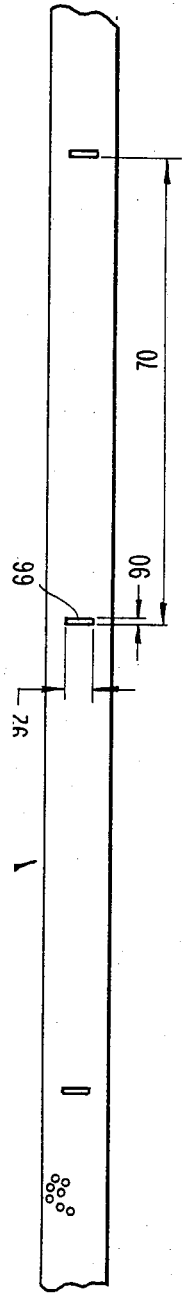

Fig.3

| TIME | T1 | T2 | T3 | T4 | T5 | T6 | T7 | T8 | T9 | T10 | T11 |
|---|---|---|---|---|---|---|---|---|---|---|---|
| SECT. 1 | ON | ON | OFF | OFF | OFF | OFF | OFF | OFF | OFF | OFF | OFF |
| 2 | ON | ON | ON | OFF | OFF | OFF | OFF | OFF | OFF | OFF | OFF |
| 3 | OFF | ON | ON | ON | OFF | OFF | OFF | OFF | OFF | OFF | OFF |
| 4 | OFF | OFF | ON | ON | ON | OFF | OFF | OFF | OFF | OFF | OFF |
| 5 | OFF | OFF | OFF | ON | ON | ON | OFF | OFF | OFF | OFF | OFF |
| 6 | OFF | OFF | OFF | OFF | ON | ON | ON | OFF | OFF | OFF | OFF |
| 7 | OFF | OFF | OFF | OFF | OFF | ON | ON | ON | OFF | OFF | OFF |
| 8 | OFF | OFF | OFF | OFF | OFF | OFF | ON | ON | ON | OFF | OFF |
| 9 | OFF | OFF | OFF | OFF | OFF | OFF | OFF | ON | ON | ON | OFF |
| 10 | ON | OFF | OFF | OFF | OFF | OFF | OFF | OFF | ON | ON | ON |

Fig.6

METHOD AND DEVICE FOR PRODUCING FULL TONE IMAGES FROM A VIDEO INPUT

BACKGROUND OF THE INVENTION

1. Field of the Invention:

This invention relates to image recorders and more particularly to a method and device for producing a full tone image on photosensitive paper from a video input.

2. Description of the Prior Art:

The disclosed invention is particularly applicable to an image recorder for producing photographs of meteorological data sent by a weather satellite but is also applicable to producing a full tone photograph from any video input. Current image recorders are very expensive machines which require substantial upkeep for proper functioning. These image recorders use a cathode ray tube (CRT) or a laser to create a flying spot of light which is controllably scanned across photosensitive paper to generate an image from video data. CRTs and lasers are expensive equipment and both require sophisticated electronic circuitry, such as deflection and focusing circuitry, to produce a flying spot of light. In view of the cost of the components and the sophistication of the circuitry involved in current image recorders these devices are out of the price range of most consumers in the field. Once a consumer purchases one of these image recorders, the consumer is faced with further expensive upkeep costs to keep the sophisticated circuitry functioning properly to produce quality images. The only major option currently available to consumers is to purchase equipment that produces dot matrix type pictures which create a pointillistic image rather than a full tone image.

SUMMARY OF THE INVENTION

The disclosed invention uses relatively inexpensive means to create a flying square of light which is scanned across photosensitive paper to create an image thereon from a video signal. The image recorder contains standard electronic circuitry for receiving a video signal which is digitally stored within the image recorder until it is needed to create an image from a video input on photosensitive paper. The video signal is stored with the frame, line and sync information intact so that the data can be retrieved a line at a time from storage since only a single line is printed at any one time on the photosensitive paper. When it is time to print a line the data for a single line is withdrawn from storage and is converted from digital data to current modulated analog data and is amplified by a video amplifier. The current modulated analog data is then used to drive an array of light sources such as Light Emitting Diodes (LEDs) or the dice from LEDs. LEDs or the dice from LEDs are used because the intensity of the light emitted therefrom is directly proportional to the current input therein. The light emitted from the light sources is then focused into a narrow line segment of light which is incident on a fiber optic strip. Light that is incident on the optical input surface of the fiber optic strip is guided through the fiber optic strip and irradiates from the optical output surface of the fiber optic strip. Running across the top of fiber optic strip is an opague belt with an aperture that is at right angles to the line segment of light and the fiber optic strip. As the belt traverses the fiber optic strip a flying square of light is created since light is only able to reach the fiber optic strip by passing through the aperture in the belt. The flying square of light has its dimensions limited by the width of the fiber optic strip and the width of the aperture in the belt. Photosensitive paper is drawn past the output surface of the fiber optic strip so that the flying square of light exiting the fiber optic strip irradiates the paper and leaves a latent image thereon. As the belt traverses the fiber optic strip the intensity of the light from the light sources is modulated by the current modulated analog signal from the video amp causing the flying square of light to be intensity modulated in accordance with the video information received by the image recorder. A control unit is used that controls the movement of the belt, the movement of the paper and the modulation of the light sources to ensure that the intensity of the light striking the paper at any point corresponds to the intensity of light necessary to develop that point of paper so that the finished picture will exactly represent the video data received. As a further quality control measure, the amount of light irradiating the photographic paper at any moment can be sensed by a photodiode placed behind the paper and optical feedback can be used to correct any defects in either the light sources or the fiber optic strip. When the video information for a single picture has been used to irradiate the photosensitive paper, the paper is cut and developed to produce a photograph.

It is an object of this invention to create a relatively inexpensive image recorder capable of producing full tone photographs from a video input.

Related objects and advantages of the present invention will be apparent from the following description.

BRIEF DESCRIPTION OF THE DRAWINGS

FIG. 3 is a top view of the scanning belt.

FIG. 6 is a timing diagram for the LED sequencer.

DESCRIPTION OF THE PREFERRED EMBODIMENT

Figure 1:
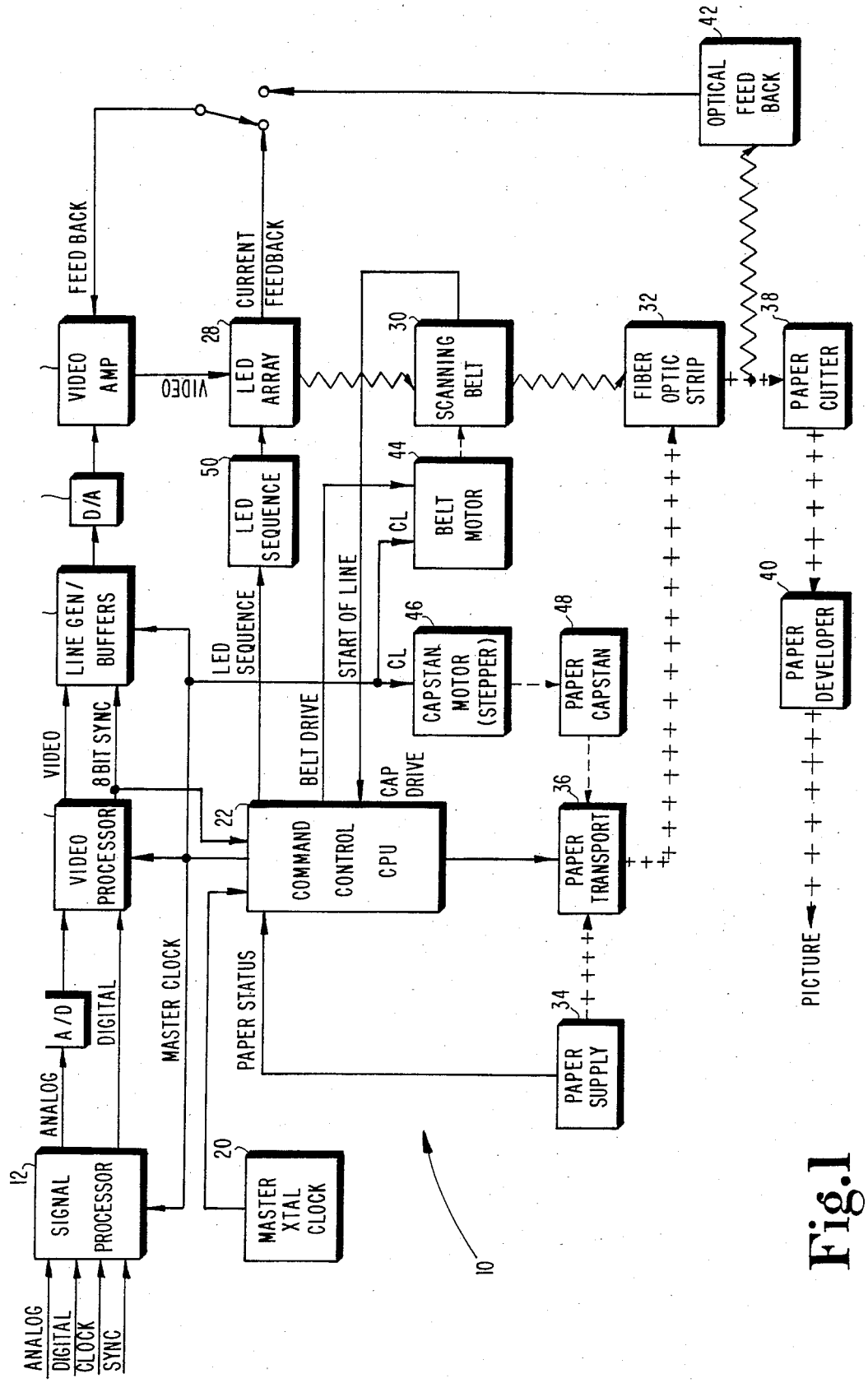
FIG. 1 is a schematic block diagram of an image recorder according to the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

In describing a device for production of a full tone image from a video input, the method for producing a full tone image will be apparent.

Referring to FIG. 1 there is illustrated a schematic block diagram of a full tone image recorder 10 according to the present invention. Image recorder 10 has a signal processor 12 for receiving a video signal (illustrated by the incoming lines) from a remote source such as a weather satellite or picture scanner. As is apparent from the incoming lines in FIG. 1, the video signal received may be either an analog signal or a digital signal with clock and sync data. If the incoming signal is analog it is converted to digital by the analog to digital converter 14. The resultant digital signal then enters video processor 16 where, if the signal is composite video, the sync information is stripped from the video signal and both signals are then sent to the line generator and buffer 10 where the information is stored. Line generator and Buffer 18 may be any of several standardly available frame buffers. A First In First Out (FIFO) serial memory is used in the preferred embodiment, although it is envisioned that a random access memory ("RAM") may also be used. From the line generator and buffer 18 lines of digitized video information conforming to lines on a photograph to be produced are clocked out a line at a time upon receipt of an appropriate signal from a master crystal (XTAL) Clock 20 and the Command Control Central Processing Unit (CPU) 22. These lines of video information are then converted to an analog voltage by digital to analog converter 24 and amplified by a video transconductive amp 26 and converted to a current signal. This current analog video signal then drives LED Array 28 which irradiates light (represented by the zig-zag lines) that varies in intensity in accordance with the analog current level. The modulated light from the LED Array 28 is then caused to fall on a scanning belt 30 and passes through belt aperture 66 and fiber optic strip 32 to create a flying square of light. The production of this flying square of light will be described in greater detail later.

The flying square of light strikes photosensitive paper which has been drawn from paper supply 34 by paper transport 36 and past fiber optic strip 32. The crossed lines in FIG. 1 represent the path of the paper through image recorder 10. The paper is then passed through a paper cutter 38 which cuts the paper at the end of the picture and the paper is then developed in paper developer 40 to produce a picture. The light irradiated on the paper may be sensed by an optical feedback device 42 or current feedback from the LED Array 28, either of which will create a feedback loop which will regulate the optical output of the LED Array 28 in accordance with the video input signal.

As can be seen from FIG. 1 the command control CPU 22 and the master XTAL clock 20 control the various components of image recorder 10 to insure that an exact photograph is produced from the video input. The scanning belt 30 is controlled by a belt motor 44 which receives belt drive information from the CPU 22 and clocking information derived from master XTAL clock 20. CPU 22 and XTAL clock 20 also control the capstan motor 46 for the paper capstan 48 and the paper transport 36. Additionally, CPU 22 may control LED sequencer 50 which will control the sequence of lighting of various sectors of LEDs in the LED Array 28 in order to reduce the duty cycle thereby increasing the light power efficiency. The master clock also controls the clocking out of information from the line generator and buffer 18. It is therefore apparent from the drawings that master clock controls the clocking out of the video signal from the line generator and buffer 18, the LED Array 28, the scanning belt 30 and the paper capstan 48 to insure that an exact photographic image is formed on the photosensitive paper regardless of varying environmental conditions or the necessity for precision components. The precise interaction of the clock 20 and the CPU 22 with various other components will be described in greater detail later.

Figure 2:
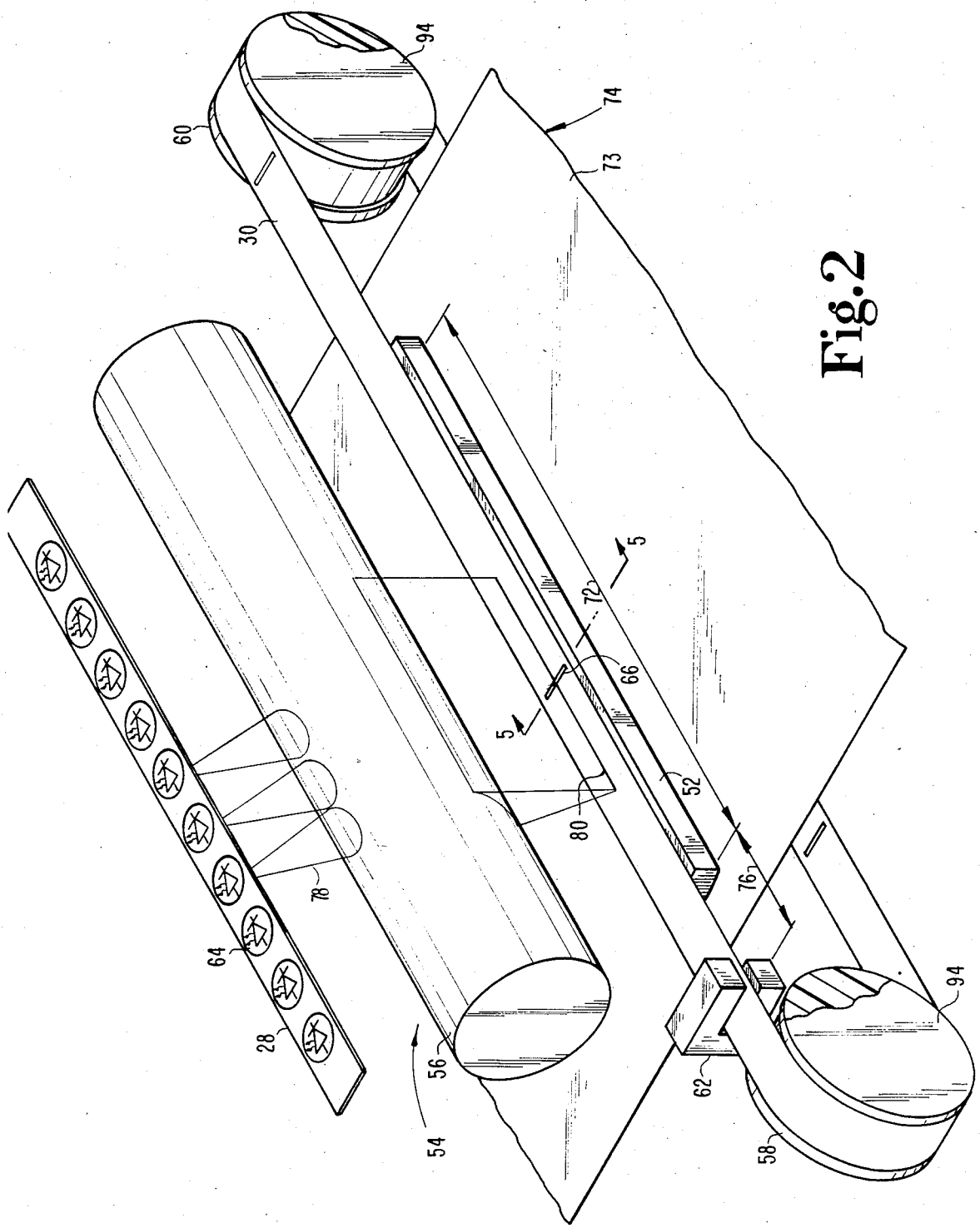
FIG. 2 is a diagram of the flying square scanner.

Referring now more particularly to FIG. 2 LED Array 28 and flying square scanner 54 are illustrated in greater detail. Flying square scanner 54 consists of LED Array 28 condensing rod 56, opaque scanning belt 30, fiber optic plate 52, idler pulley 58, driven pulley 60 and position sensor 62. Each individually circled LED symbol represents a sector 64 consisting of four individual LEDs in the preferred embodiment. The entire LED array is an arrangement of LEDs in a straight line. As can be seen from the drawing there are ten individual sectors 64 in LED array 28 meaning that there are forty individual LEDs in the preferred embodiment. LED array 20 is preferably constructed from the type H1000, H2000 or H3000 LEDs commercially available from Standly Electric Co. Ltd.

Scanning belt 30 is a continuous inextensible loop disposed between idler pulley 58 and driven pulley 60. Idler pulley 58 is designed to spin freely about its rotational axis and maintain tension in scanning belt 30. Scanning belt 30 is rotated at a constant speed by driven pulley 60 which is driven in turn by belt motor 44. Belt motor 44 revolves at a constant speed which is determined by pulses from the master clock 20. As is illustrated more clearly in FIGS. 3 and 5, scanning belt 30 has a number of equally spaced apertures 66 therein and has a slightly pebbled or rough surface 68 in order to provide an air bearing 69 between the fiber optic plate surface and the belt. The distance 70 between the apertures 66 is greater than the width 72 of the portion 73 of the photosensitive paper 74 which is irradiated by the flying square scanner 54.

As scanning belt 30 revolves, aperture 66 will pass through position sensor 62 which will send a start of line (SOL) signal to the CPU 22. Position sensor 62 may be any type of commercially available position sensor using a photosensitive diode and a light source. As belt 30 passes through position sensor 62, light from the position sensor's light source is prevented from reaching the photosensitive diode by the opaque portion of the belt. When aperture 66 passes through position sensor 62, light strikes the photosensitive diode and a signal pulse is generated. This signal pulse is the start of line (SOL) signal. In the preferred embodiment a position sensor using infrared radiation is used to avoid visible light leakage which may inadvertently expose photosensitive paper 74. Position sensor 62 is anchored at a fixed distance 76 from where the flying square scanner will begin to irradiate photosensitive paper 74. Upon receipt of the SOL signal the CPU 22, knowing that belt 30 revolves at a fixed rate and that the SOL position sensor 62 is a fixed distance from where lines will be formed on photosensitive paper 74, will at the appropriate time allow the master clock to begin clocking a video line of data out of line generator and buffer 18. As previously described, this video line of data will be converted to an amplified analog current signal which will modulate the intensity of the light from LED array 28.

The manner in which the master clock 20 and the CPU 22 interact to provide an exact picture from a video signal will now be further described. There are two important requirements which must be met to ensure that an exact picture is produced. First, there must be exact spatial placement of each picture element (pixel) on the photosensitive paper. To be effective, image recorders must provide for precision spatial placement regardless of environmental conditions and timing errors in the video signal. If the picture is not spatially correct, a distorted picture occurs. Second, the speed of the spot across the paper must be unconditionally constant. Since photographic paper is exposed by light power (typically measured in ergs), not only does the extent of exposure (image density or gray content) of the paper vary with the intensity of the light on a spot but it also varies with the amount of time that light is on the spot. Therefore, if a specific current produced a specific light power from the LED array 28 and the aperture belt 30 caused the spot to move at a non-constant rate then the resulting image density would also vary.

Certain practical problems arise however in addressing the requirements stated above. For example, if the flying spot were caused to move at a constant speed, but the input video signal was not arriving at a constant rate (i.e. a poor tape recording playback, or a doppler shift due to the satellite orbital movement) then both the spatial placement and the light power would vary causing a spatially distorted picture with a gray content not in accordance with the original picture. Also, if the non-precision source had a periodic non-uniformity then a pattern of gray variation would be very apparent in the reproduction. Additionally, there are problems in causing the flying spot to move at a constant rate directly related to the need to drive the scanning belt 30 at a constant rate.

One might think that an appropriate way to ensure that the flying spot moves at a constant rate would be to use a very precise locked drive system. Two problems arise with this type of system: (1) the drive pulley must be manufactured within very tight tolerances (a 0.001 inch error would cause a 2.5 inch skew in the picture); and (2) the various drive system components available to move the pulleys and belt in a locked system are very expensive if the precision required is obtained. Even if the device were originally manufactured with precision components, temperature variations within the device would cause thermal expansion and contraction of the components so as to cause error. Therefore the device disclosed herein uses master clock 20 and a CPU 22 as an inexpensive way to meet the requirements of the image recorder.

In the disclosed device a clock signal from the precision XTAL master oscillating (OSC) clock 20 is fed to the CPU 22 where the CPU 22 compares the OSC signal with the incoming signal and changes the master clock signal to accommodate changing input timing. This is accomplished by measuring the signal transmission rate of the incoming signal, preferably by measuring sync pulse timing, and deriving the master clock signal accordingly. Therefore, even if the video is put into video storage at a varying rate, it is read out at a constant rate. The CPU in making this comparison, compares the master OSC signal, the SOL signal and the line sync information from the video signal. If the CPU determines that the system will run out of flyback time (void between each video line) then an adjustment is made to the belt speed and an adjustment is made to the video word to compensate its magnitude in order to have the light power developed by the LEDs provide the different light intensity to maintain the same gray level. Also, since the master clock drives the capstan, the aspect ratio of the picture is preserved regardless of timing variations.

Additionally, a stepper motor is used to ensure that the belt does not slip on the drive pulley. The same clock that clocks out the video to the LEDs also drives the belt, thereby providing for unconditionally correct spatial placement of each pixel on the paper. By resetting the master clock each time a SOL signal is received the precision required of the drive pulley is eliminated. Also, this resetting of the master clock with each new line eliminates the accumulation of error caused by imprecise mechanical elements and imprecise belt speed.

Although the analog current signal could be used to modulate the entire LED array 28 simultaneously, it has been found that the light output of the LED array 28 is substantially increased by providing a lower duty cycle for each LED. LED sequencer 50 is provided to ensure that only three sectors 64, or twelve individual LEDs, are modulated at any instant. The CPU 22 knows the exact position of the belt at any instant since belt 30 traverses the fiber optic plate 52 at a fixed speed determined by master clock 20. Thus the CPU 22 and LED sequencer 50 are designed to turn on those three sectors 64 of LEDs generally closest to the aperture at any instant and leave the remaining LEDs off until needed. FIG. 6 is a timing diagram showing which LED sectors 64 would be lit during any period of time. The time periods are based on eleven areas with the first ten being areas in which the photosensitive paper is being irradiated with light and the eleventh area being after the end of a line and before the start of a new line. The sectors are numbered in increasing order beginning with the sector closest to where a line will begin printing. It is envisioned that any appropriate duty cycle can be arranged and that none need necessarily be used. One reason for ensuring that an equal number of sectors is modulated at any instant during irradiation of the photosensitive paper is to satisfy the current feedback loop to be described later.

When the analog current signal begins to drive the LED array 28, the LEDs emit light 78 which has its intensity modulated linealy with respect to the current of the analog current input. Although the description thus far has used the terms LED and LED array, it should be understood that any light source whose output can be controlled in any way would work. LEDs have been described because the light intensity output therefrom varies in a generally linear fashion with respect to the current input and are relatively inexpensive with long life and require little supporting circuits. It is envisioned that an array of dice similar to those used in discreet LEDs may be manufactured into a unitary array and still come within the teaching of this disclosure.

The light 78 emitted from the LED array is focused into a light line segment 80 by condensing rod 56. Condensing rod 56 is illustrated simply as a cylindrical lens because of the well known quality of cylindrical lenses of focusing a point source of light into a line segment of light. LED Array 28, condenser rod 56 and fiber optic plate 52 are arranged so that light line segment 80 is focused upon the fiber optic strip 32.

Fiber optic strip 32 which forms the video image line on the photosensitive paper can be formed by coating, masking or by some other means destroying the transparency of a portion of the optical input surface 84 of fiber optic plate 52 with an opaque material 86. Plate 52 is composed entirely of optical fibers extending from the optical input surface 84 to the optical output surface 96. Light incident on fiber optic plate 52 may only enter those optical fibers in fiber optic strip 32. The fiber optic strip can also be formed by direct suspension of the strip in an opaque carrier. Fiber optic strip 32 extends longitudinally across fiber optic plate 52 for at least the width 72 of the portion 73 of photosensitive paper 74 to be irradiated. Fiber optic strip 32 is of a uniform width 88 throughout fiber optic plate 52 and along its length. This width 88 creates a first dimensional restriction on the flying square of light which will irradiate the photosensitive paper. The width 88 is equal to the desired Y diameter (or height) of the video pixel to be produced, while the aperture width 90 in the scanning belt is equal to the X diameter (or width) of the pixel, thereby obtaining a non-astigmatic spot.

As can be seen from the drawings, a second dimensional restriction on the flying square of light is produced by the width 90 of the aperture 66 in scanning belt 30. Pulleys 58 and 60 are arranged so that scanning belt 30 is drawn logitudinally across fiber optic plate 52. The pulleys, scanning belt and fiber optic materials are all of a non-metallic nature, thereby developing a slight electrostatic force due to the rubbing of the belt upon the fiber optic plate. This force draws the belt to the fiber optic input surface ensuring that a quality spot is generated. Aperture 66 is a transverse aperture in belt 30 with its length 92 greatly exceeding the width of fiber optic strip 32 to remove the need for the precision placement of the belt in the Y plane and its width 90 approximating the width 88 of fiber optic strip 32. As is most clearly illustrated in FIG. 5, the line segment of light 80 is actually more of a rectangle of light which is always wider than the fiber optic strip 32. This allows length 92 to vary in the Y plane without causing a spot variation. This feature greatly enhances the ability of the image recorder to operate within a severe environmental condition of shock and vibration and still produce a precision spot. The reason the aperture length 92 greatly exceeds the width of fiber optic strip 32 is to allow for a certain amount of wobble in scanning belt 30 as it is drawn across fiber optic plate 52. The belt and the pulleys are positioned so that transverse aperture 66 is at right angles to light line segment 80. Since light line segment 80 is colinear with fiber optic strip 32 it should be understood aperture 66 is at right angles with fiber optic strip 32 also.

Another feature of the disclosed invention that addresses the wobble of belt 30 in the Y plane is the fact that the belt is constructed with dielectric material with a rough or pebbled surface and the idler pulley 58 and driven pulley 60 are made of plastic 94. As belt 30 is driven across fiber optic plate 52 an electrostatic attraction force is created between belt 30 and fiber optic plate 52 which ensures spot fidelity. The pulleys are plastic to prevent discharging this electrostatic force.

Figure 4:
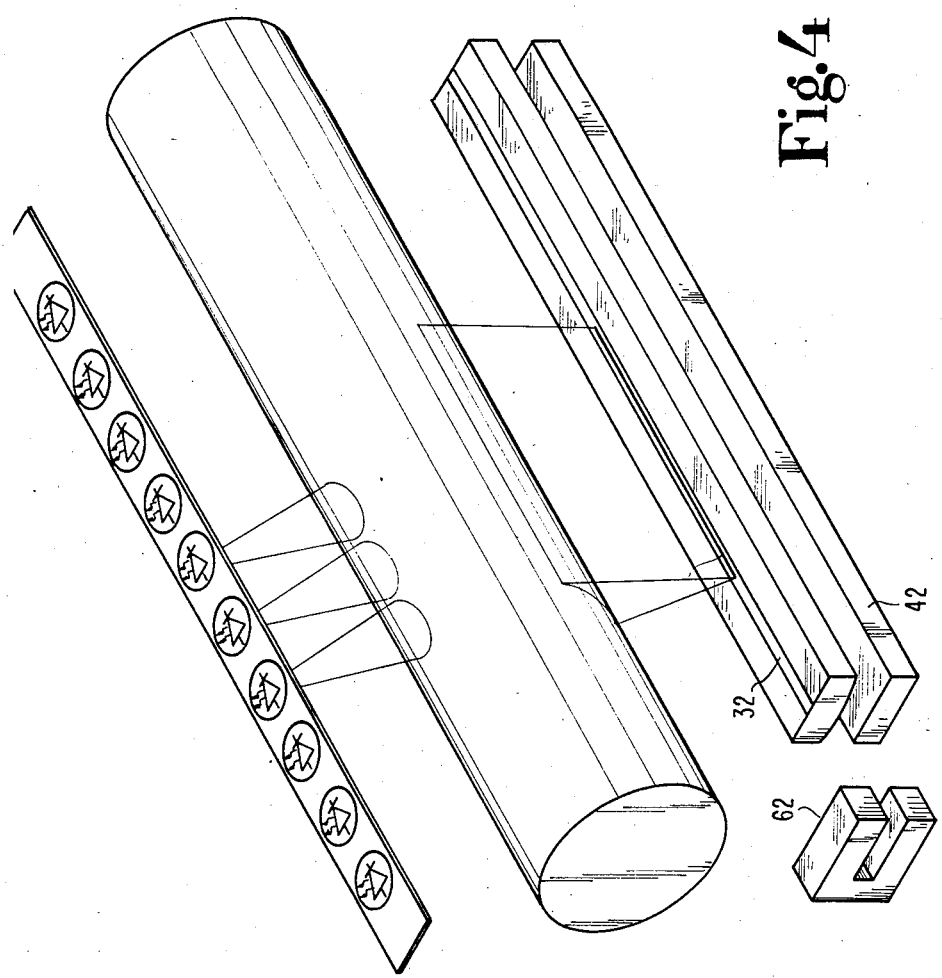
FIG. 4 is the FIG. 2 diagram with the paper and opaque belt removed to reveal more detail of the flying square scanner.
Figure 5:
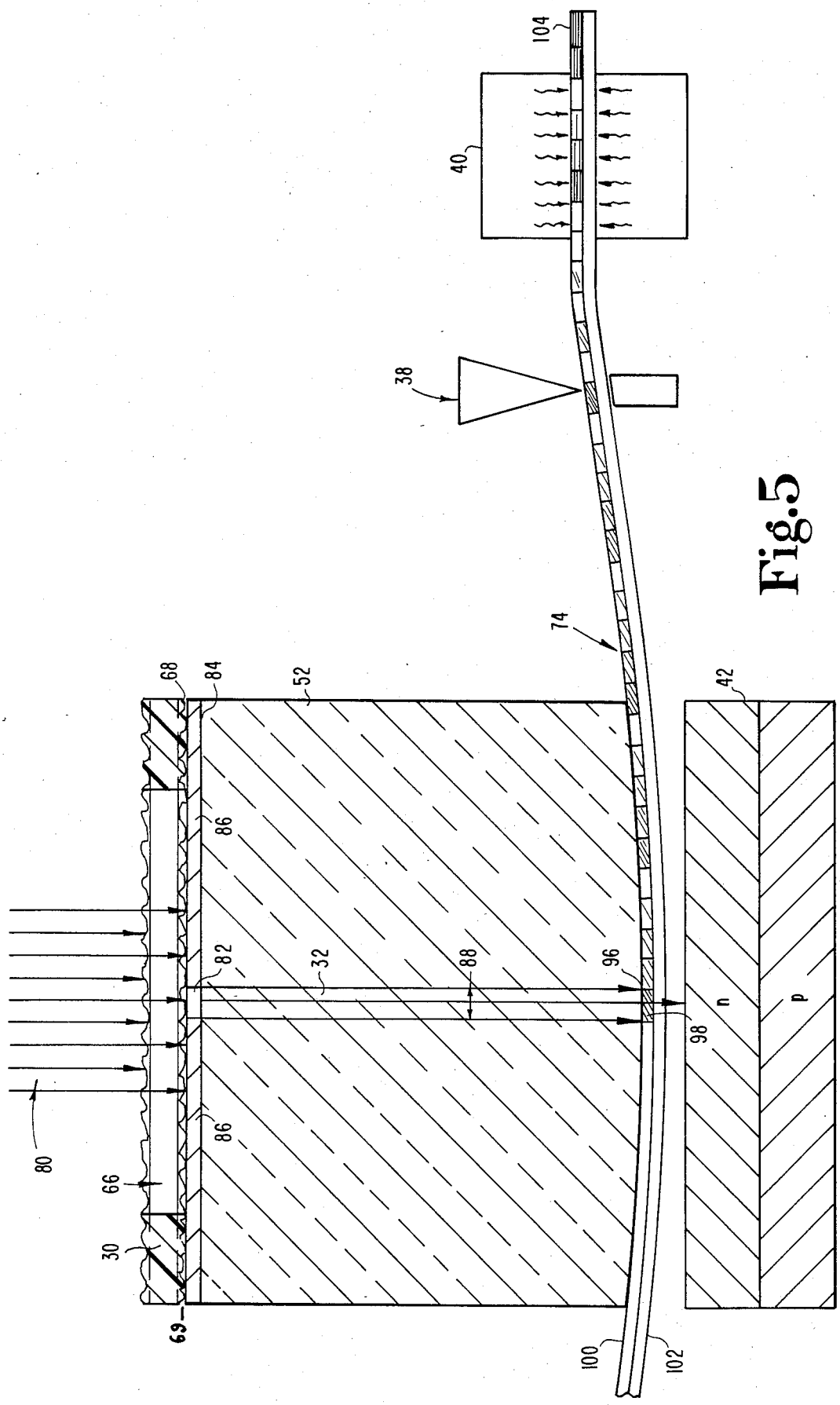
FIG. 5 is a cross-sectional view along line 5—5 of FIG. 2.

FIGS. 2, 4 and 5 illustrate the operation of flying square scanner 54. Light line segment 80 falls on the segment of belt 30 that contains aperture 66. Only that portion of the incident light that falls on aperture 66 is allowed to reach the optical input surface 84 of fiber optic plate 52 as the remainder is blocked by the opaque belt 30 and the opaque coating 86. Light entering fiber optic strip 32 is guided by the optical fibers therein and irradiates from the optical output surface 96 of fiber optic plate 52. Light irradiating from the optical output surface 96 is a precise and efficient image of the square formed by aperture 66 and fiber optic strip 32. As is illustrated the optical output surface 96 is radiused so that photosensitive paper 74 passed by fiber optic plate 52 has a single mechanical interface with the plate and enhances intimate and continuous contact.

Light incident on photosensitive paper 74 causes an invisible latent image 98 (represented by cross-hashing of various shadings) to be formed thereon. Dry silver paper such as Minnesota Mining and Manufacturing's (3M's) Dry Silver Paper Type 7773 or 7774 is used in the preferred embodiment. This paper is high resolution negative acting photosensitive paper designed for full tone applications using a red light emitting light source. In view of the nature of the paper, red LEDs are used in the preferred embodiment. Photosensitive paper 74 has a paper base 100 and a photosensitive coating 102, which in the Type 7773 or 7774 dry silver paper is a dry silver coating. The depth of the tone produced on the paper is a function of power of the light striking the surface. Another quality of Type 7773 or 7774 paper stock is that the translucency of the paper is fairly constant throughout and thus an established proportion of light incident on the photosensitive surface will radiate through the paper. This quality along with other qualities of the disclosed invention allows for the use of optical feedback to insure that the appropriate amount of light is striking the paper at any instant.

Optical feedback may be used by sensing the light coming through the photosensitive paper 74. An optical feedback device 42 may be placed behind the photosensitive paper to generate a current proportional to the amount of light coming through the paper. The current is also proportional to the amount of light incident on the paper because the amount of light coming through the paper is proportional to the amount of light incident on the paper in high quality paper. Since the paper is driven by a stepping motor running off pulses from the master clock and the belt is also driven by a motor controlled by the master clock, the amount of time that light is incident on any spot on the paper is known. The analog current signal is proportional to the intensity of the light which should be striking the paper at any instant. By comparing the analog current input to the current from the optical feedback device, a feedback loop is provided which increases or decreases the intensity of the light emitted from the LED array to assure that an appropriately intense light is striking the photosensitive paper at any instant.

Optical feedback device 42 is illustrated to be a single photodiode extending the full length of the fiber optic strip 32. In the preferred embodiment optical feedback device 42 is a long line Schottky barrier photodiode such as United Detector Technology's Model No. PIN-L9. It is also envisioned that an optical wedge and a small area photodiode could be used as optical feedback device 42.

Paper 74 is driven past the fiber optic strip a line at a time or continuously by a stepping motor controlled by the master clock 20. Each small rectangle similar to invisible latent image 98 represents a cross section along a single line of the photograph. As was previously described the paper is cut by paper cutter 38 and then developed in developer 40. Developer 40 is shown as using heat to produce visual image 104 (represented by the horizontal shading to illustrate various tone depths). The latent invisible image catalyzes the formation of silver metal when heated to produce a visible silver image on the dry silver paper.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A full tone image recorder comprising;
   intensity modulated light source means for providing a source of light which has an intensity that is generally linearly modulated relative to modulations in a current input;
   light focusing means for focusing the source of light generated by said intensity modulated light source means into a line segment of light;
   flying spot generating means for generating a flying spot of light, said flying spot generating means further comprising;
   a fiber optic strip arranged to be co-linearly irradiated by the line segment of light created by said light focusing means, said fiber optic strip having a transverse dimension defining a first dimensional constriction on said flying spot of light, said fiber optic strip having an optical input surface and an optical output surface;
   an inextensible opaque belt with a lateral aperture disposed therein, said lateral aperture defining a second dimensional constriction on said flying spot of light;
   a belt transportation means for passing said belt over said fiber optic strip so that said lateral aperture is in rectilinear relationship to said fiber optic strip;
   a source of photosensitive material;
   material transportation means for transportation of material from said source of photosensitive material past said optical output surface of said fiber optic strip; and,
   control means for controlling said intensity modulated light source means, said belt transportation means and said material transportation means to produce a latent precision image on said photosensitive material that conforms to a video input.

2. The image recorder of claim 1 and further comprising an optical feedback means for instantaneously sensing the intensity of a light reaching the photosensitive paper and a signal derived from said video input and adjusting a current input to said intensity modulated light source means to bring the intensity of the light reaching the photosensitive material into conformity with an expected intensity of light for the current derived from said video input.

3. The image recorder of claim 2 wherein said intensity modulated light source means is an array of dice as used in light emitting diodes.

4. The image recorder of claim 2 wherein said opaque belt has a plurality of said lateral apertures therein.

5. The image recorder of claim 4 wherein said fiber optic strip is formed by masking portions of a fiber optic plate with an opaque material to define said fiber optic strip.

6. The image recorder of claim 4 wherein said fiber optic strip is formed by suspending a strip of fiber optic material in an opaque carrier.

7. The image recorder of claim 2 wherein said optical feedback means comprises a photodiode disposed behind said photosensitive material within the optical path of a light which has passed through said fiber optic strip.

8. The image recorder of claim 7 wherein said optical feedback means comprises a photodiode and an optical wedge disposed behind said photosensitive material within the optical path of a light which has passed through said fiber optic strip and said optical wedge is positioned to cause light incident thereon to migrate to said photodiode.

9. The image recorder of claim 1 wherein said intensity modulated light source means is an array of light emitting diodes.

10. The image recorder of claim 9 wherein said array of light sources is divided into sectors and only a predetermined number of sectors are modulated at any instant.

11. The image recorder of claim 9 wherein said opaque belt is manufactured of a dielectric material having a slightly pebbled surface to create an air bearing between said opaque belt and said fiber optic strip as said belt traverses said fiber optic strip.

12. The image recorder of claim 11 and further comprising an optical feedback means for instantaneously sensing the intensity of a light reaching the photosensitive material and a signal derived from said video input and adjusting a current input to said intensity modulated light source means to bring the intensity of the light reaching the photosensitive material into conformity with an expected intensity of light for the current derived from said video input.

13. The image recorder of claim 9 wherein said focusing means is a cylindrical lens.

14. The image recorder of claim 9 wherein said optical output surface is radiused to allow said photosensitive material to have a single mechanical contact with said optical output surface.

15. The image recorder of claim 1 wherein said array of light sources is divided into sectors and only a predetermined number of sectors are modulated at any instant.

16. The image recorder of claim 1 wherein said opaque belt is manufactured of a dielectric material having a slightly pebbled surface to create an electrostatic attractive force between said opaque belt and said fiber optic strip as said belt traverses said fiber optic strip.

17. The image recorder of claim 16 wherein said belt transportation means further comprises a variable-speed motor, a plurality of pulleys at least one of which is driven by said motor and a tension means for maintaining tension in said opaque belt as said opaque belt is disposed between said plurality of pulleys and wherein said pulleys are positioned relative to said fiber optic strip so that the transverse aperture in said opaque belt is maintained in a rectilinear relationship to said fiber optic strip as said opaque belt revolves around said pulleys.

18. The image recorder of claim 17 wherein said pulleys are manufactured of an electrically insulated material to prevent discharging any electrostatic attractive force between said opaque belt and said fiber optic strip.

19. A full tone image recorder comprising:
   energy source means for receiving a video signal and emitting a source of energy which has a modulated intensity relative to said video signal;
   flying spot generating means for generating a flying spot of energy, said flying spot generating means including;
   an energy guide strip arranged to be irradiated by said energy emitted from said energy source means, said energy guide strip having a transverse dimension defining a first dimensional constriction on said flying spot of energy, said energy guide strip having an energy input surface and an energy output surface;

a belt with a lateral aperture disposed therein, said lateral aperture defining a second dimensional constriction on said flying spot of energy, said belt being constructed of material which prevents the propagation of said energy through the belt and said lateral slot being designed to allow the transfer of said energy therethrough;

a belt transportation means for passing said belt over the energy input surface of said energy guide strip so that said lateral aperture is in rectilinear relationship to said energy guide strip;

a source of photographic material sensitive to variations in the intensity of said energy;

material transportation means for transportation of material from said source of photographic material past said energy output surface of said energy guide strip; and, control means for controlling said energy source means, said belt transportation means and said material transportation means to produce a precision image on said photographic material.

20. The image recorder of claim 19 wherein said energy source means is an electromagnetic radiation source means which produces electromagnetic radiation as said energy and wherein said energy guide strip is a wave guide strip and wherein said photographic material is sensitive to electromagnetic radiation.

21. The image recorder of claim 20 wherein said energy guide strip is a fiber optic strip.

22. The image recorder of claim 21 wherein said energy source means is a light source means and said energy provided thereby is light and wherein said photographic material is photosensitive.

23. The image recorder of claim 19 wherein said energy emitted by said energy source means is condensed into a line segment of energy by a condenser arranged to cause said line segment of energy to fall on said energy guide strip.

24. A method for producing full tone images from a video input comprising;
receiving an analog or digital video input signal;
storing said video input signal in digital form in a data storage device;
converting stored digital video information to an analog current signal;
modulating the intensity of light from an array of light emitting diodes with said analog current signal;
creating a flying spot of light by
irradiating a fiber optic strip with intensity modulated light; and
scanning said fiber optic strip with an opaque belt with an aperture therein;
exposing photosensitive material to said flying spot of light by passing said photosensitive material beneath said fiber optic strip.

25. The method of claim 24 and further comprising;
sensing the intensity of said flying spot of light;
comparing said intensity to an expected intensity for the value of the analog current signal modulating said array of light emitting diodes;
adjusting the intensity of the flying spot of light by adjusting the analog current signal modulating the LED array.

26. The method of claim 25 wherein said passing of said photosensitive material beneath said fiber optic strip is accomplished by stepping said material a line at a time past said fiber optic strip and further comprising controlling said stepping of said material with pulses from a master clock.

27. The method of claim 26 wherein said scanning step is accomplished by driving said belt with a motor and pulley configuration and further comprising controlling said motor's operation with pulses from a master clock.

28. The method of claim 27 and further comprising clocking said stored digital data out of said data storage device with pulses from a master clock wherein pulses from the same master clock are used for controlling said stepping, controlling said motor's operation and clocking said stored digital data out of said data storage device.

29. The method of claim 25 wherein said passing of said photosensitive material beneath said fiber optic strip is accomplished by moving said material continuously past said fiber optic strip and further comprising controlling said moving of said material with pulses from a master clock.

* * * * *